(12) United States Patent
Sherwood

(10) Patent No.: US 6,921,503 B1
(45) Date of Patent: Jul. 26, 2005

(54) LOST FOAM MOLDING

(75) Inventor: Kent Sherwood, Malibu, CA (US)

(73) Assignee: Foam Matrix, Inc., Inglewood, CA (US)

( * ) Notice: Subject to any disclaimer, the term of this patent is extended or adjusted under 35 U.S.C. 154(b) by 396 days.

(21) Appl. No.: 10/308,425

(22) Filed: Dec. 2, 2002

(51) Int. Cl.$^7$ .......................... B29C 44/02; B29C 45/02
(52) U.S. Cl. ................... 264/46.4; 264/46.6; 264/257; 264/317; 264/328.7
(58) Field of Search .............................. 264/46.4, 46.6, 264/257, 258, 317, 328.7

(56) References Cited

U.S. PATENT DOCUMENTS

| | | | |
|---|---|---|---|
| 4,664,974 A | * | 5/1987 | Sherwood ................ 428/309.9 |
| 4,762,740 A | * | 8/1988 | Johnson et al. ............... 428/68 |
| 5,061,418 A | * | 10/1991 | Ware ......................... 264/46.6 |
| 5,152,949 A | * | 10/1992 | Leoni et al. ................. 264/257 |
| 5,173,227 A | * | 12/1992 | Ewen et al. ............... 264/46.6 |
| 5,288,442 A | * | 2/1994 | Bauvois ..................... 264/45.2 |
| 5,672,120 A | * | 9/1997 | Ramirez et al. ............ 473/347 |
| 5,681,519 A | * | 10/1997 | Kelman ..................... 264/257 |
| 5,686,038 A | * | 11/1997 | Christensen et al. ........ 264/257 |
| 6,264,868 B1 | * | 7/2001 | Marchant .................... 264/221 |

* cited by examiner

Primary Examiner—Allan R. Kuhns
(74) Attorney, Agent, or Firm—Leon D. Rosen

(57) ABSTRACT

A method is provided for molding an article (10) that includes a polymer (100) such as an epoxy resin, reinforced by fibrous material (102) such as fiberglass which is embedded in the polymer material, especially for a hollow article such as a shell. The method includes placing spacers (42, 44) in a mold cavity (30), where the spacers conform closely to the cavity surface and leave a free, or empty volume (64) within themselves. Foamable material (60A) is placed in the free volume and allowed to expand and push the spacers toward the cavity walls while forming a foam core (70) within the spacers. The mold is opened and the spacers and foam core are removed. Next, the foam core is covered with an impervious layer and the fibrous material (72) is wrapped around the foam core. The foam core is placed back in the mold, with the fibrous material spacing the foam core from the walls of the mold. Then, the resin is injected into the mold, into the space (80) between the foam core and the mold walls, to embed the fibrous material in the resin. When the resin hardens, the article formed by fibrous material embedded in resin and the foam core within the article, are removed from the mold, and the foam core is removed from the article.

8 Claims, 4 Drawing Sheets

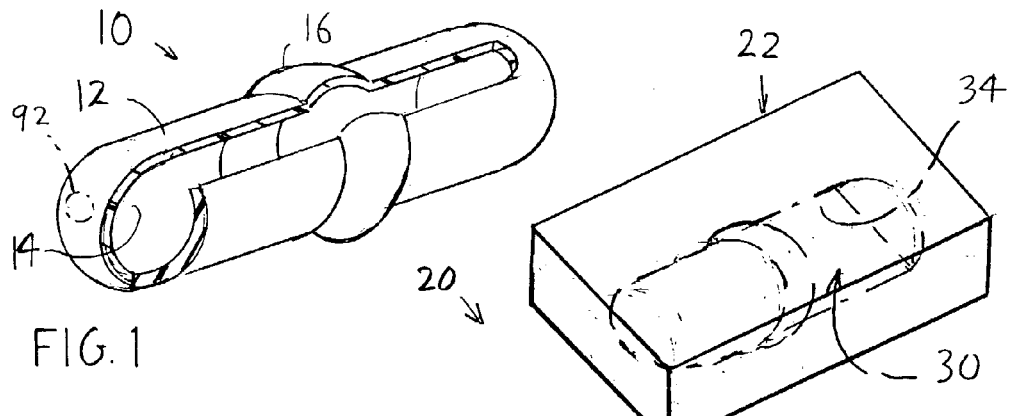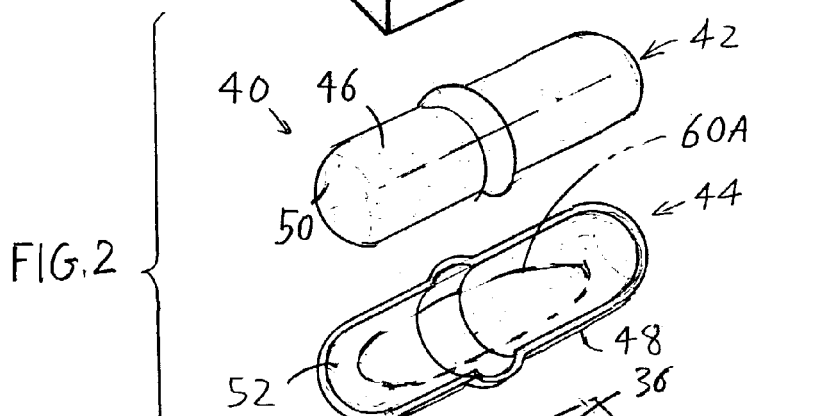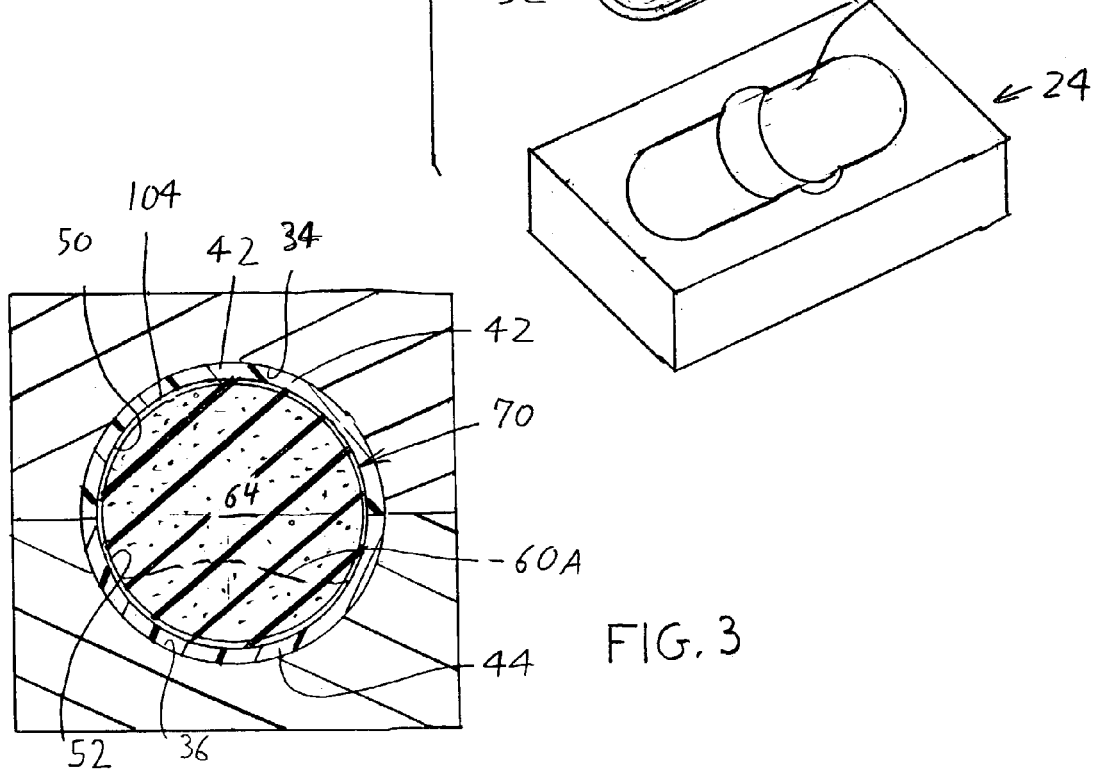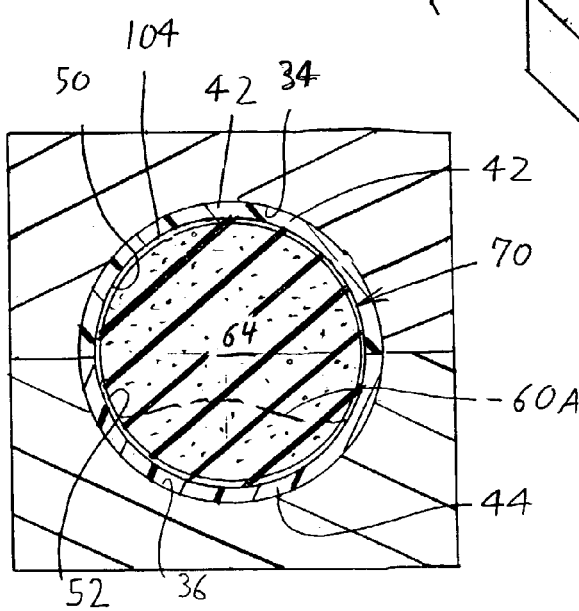

LOST FOAM MOLDING

BACKGROUND OF THE INVENTION

Lightweight and strong articles with relatively thin walls, of a strong polymer such as an epoxy resin, can be strengthened by embedding fibrous materials such as fiberglass within the resin. When the article is large and only a limited number are to be made, it would be desirable if the article could be manufactured at low cost and with the walls of the article of controlled thickness.

SUMMARY OF THE INVENTION

In accordance with one embodiment of the present invention, a method is provided for constructing a fiber-reinforced polymer article in limited volumes, at low cost. The method is especially useful in molding large hollow articles. The method includes forming a mold cavity with cavity walls corresponding to the outside surface of the article to be molded. First, one or more spacers that each have a thickness equal to that of the desired article, are placed in the mold cavity, with each spacer having an outer surface conforming to the mold cavity, and leaving a free, or empty core-molding volume. Foamable material is placed in the free volume and the mold is closed to allow the material to foam and expand until it presses the spacer or spacers firmly against the cavity walls. The result is a foam core that presses against the spacer(s) and that is spaced from the cavity wall by the thickness of the spacer(s).

The mold is opened and the spacers and foam core are removed. The foam core is then wrapped in fibrous material and placed back in the mold, without the spacers. A polymer material such as an epoxy resin, is injected into the mold, to fill the space between the foam core and the cavity surface and to encapsulate the fibrous material lying therein. After the polymer material hardens, the mold is opened again and the article, formed by the resin impregnated by fibrous material, and the foam core are removed from the cavity. In most cases, the foam core is then detached from the article, which may require the foam core to be broken up to pull it out of a hollow article.

The novel features of the invention are set forth with particularity in the appended claims. The invention will be best understood from the following description when read in conjunction with the accompanying drawings.

BRIEF DESCRIPTION OF THE DRAWINGS

FIG. 1 is a partially sectional isometric view of an article that can be constructed by the method of the present invention.

FIG. 2 is an exploded isometric view of apparatus for forming a foam core.

FIG. 3 is a sectional view of the apparatus of FIG. 2, showing a step in the construction of a fiber-reinforced polymer article.

DESCRIPTION OF THE PREFERRED EMBODIMENTS

Figure 4:
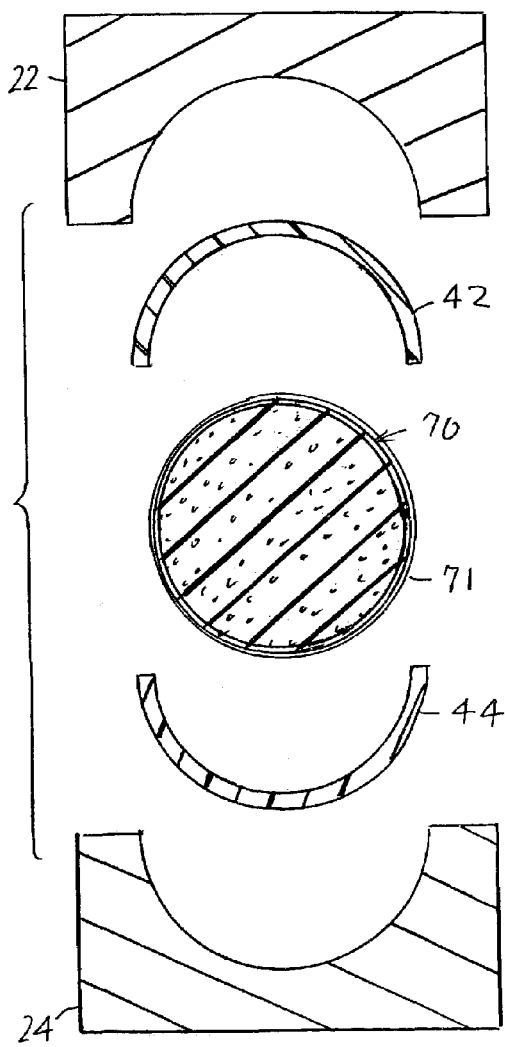
FIG. 4 is an exploded view of the apparatus of FIG. 3, showing a next step in the construction of the article.

FIG. 1 illustrates an article 10 which is a hollow article, in that it has outer and inner article surfaces 12, 14. The particular article is largely in the form of a cylinder with rounded ends and with a bulge at 16. The article is molded of a polymer such as an epoxy resin, and is strengthened by embedding fibrous material in the resin. If the article is at least moderately large, such as with a largest dimension of more than one foot, and especially at least one meter, and if only a limited number of the articles is to be made, then the cost of tooling, including molds, can be high. The method of the present invention minimizes the cost for constructing such a fibrous reinforced polymer article, and especially one that is hollow.

FIG. 2 illustrates apparatus 20 useful in forming the article, which includes a pair of mold members 22, 24 that form a cavity 30 between cavity walls 34, 36 that define the shape of the outside of the finished article. The apparatus also includes a spacer device 40 comprising a pair of spacers 42, 44. The spacers have outer surfaces 46, 48 that fit closely against the cavity walls 34, 36 that define the shape of the outer surface of the final article. The spacers also have inner surfaces 50, 52 that define the shape of the inside of the final article.

As shown in FIG. 3, applicant first places the spacers 42, 44 against the corresponding cavity walls, 34, 36 of the mold members and holds them in place as by removable glue, tape or small mechanical fasteners. Applicant then places a quantity of foamable material, indicated at 60A, in the free volume 64 formed between the inner surfaces 50, 52 of the spacers when the mold is closed, and closes the mold.

As indicated in FIG. 3, the foamable material 60A expands greatly in volume as it foams, until it fills the entire free volume 64 within the spacers 42, 44. Sufficient foamable material 60A has been placed in the free volume to expand and completely fill the volume and form a foam core 70.

When the foam has hardened into the solid foam core 70, the mold is taken apart as shown in FIG. 4. This leaves the mold members 22, 24, the spacers 42, 44 and the foam core 70. A layer 71 of impervious material, such as a plastic sheet (e.g. "SARAN WRAP") or other sheet (e.g. aluminum foil) is applied around the foam core.

Figure 5:
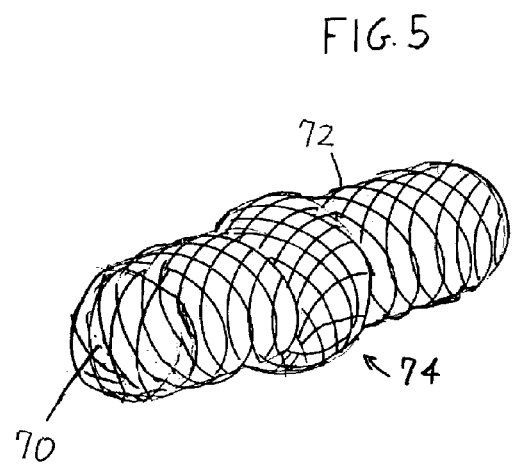
FIG. 5 is an isometric view of the foam core of FIG. 4 and a fibrous wrapping, showing a next step in the construction of the article.
Figure 6:
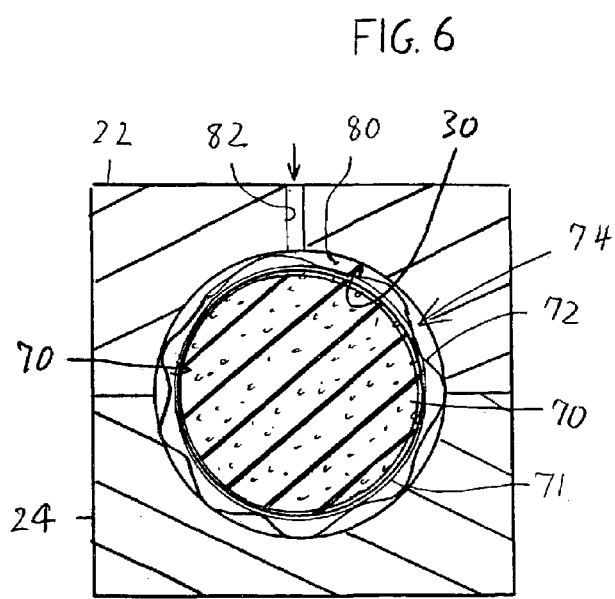
FIG. 6 is a sectional view of the apparatus of FIG. 3, but with the article having been wrapped as shown in FIG. 5 and without the spacers, in accordance with another step in the construction of the article.

FIG. 5 illustrates a next step, which is to wrap the foam core 70 (which is surrounded by film 71) in fibrous material 72. As shown in FIG. 6, the fiber-wrapped foam core 74 is then placed in the mold cavity 30 formed between the mold members 22, 24. The spacers that were present during molding of the foam core 70 are not present. The space 80 between the foam core 70 and the walls of the cavity 30 are partially taken up by the fibrous material 72 which spaces the foam core from the walls of the cavity 30. A next step is to inject polymer material into the space 80, as by injecting the polymer material through a sprue hole 82 in the mold. It is possible to use a thermoplastic polymer, but this involves additional heating of the polymer as well as the mold and foam core to near the melting temperature of the polymer, all of which is time consuming and adds expense. Instead, applicant prefers to inject a settable polymer such as a resin, and especially an epoxy resin. The resin is preferably injected under a considerable pressure of a plurality of psi (pounds per square inch) such as between 10 psi and 50 psi, to assure that it fills the entire space 80 between the foam core 70 and the walls of the cavity. During injection, the mold members 22, 24 are tightly clamped together.

After the resin has set (or other polymer has solidified) the mold is opened again. The combination, illustrated at 90 in FIG. 7, of the article 10 and the foam core 70 is removed from the mold. A next step is to remove the foam core 70 from the article 10. For most hollow articles, the foam core 70 cannot be merely pushed out of the article 10, but is disintegrated. This is usually most easily done by cutting or abrasively disintegrating the foam core through a small hole (e.g. 92 in FIG. 1) in the article, into pieces or particles that are removed from the hollow inside 14 of the article through the hole. It is also possible to dissolve the foam core.

Figure 8:
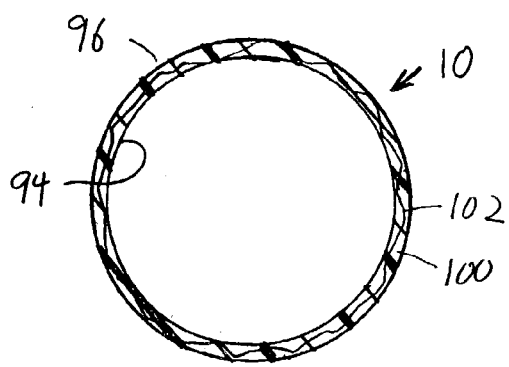
FIG. 8 is view similar to FIG. 7, after the foam core has been removed from the article.

FIG. 8 shows the final article 10 with a hollow inside 94 and an outer surface 96, and with a thickness between them, that are all closely controlled. The article includes the resin 100 and the fibrous material 102 embedded in the resin. The combination of a strong resin such as an epoxy and fibrous material embedded therein, such as fiberglass or carbon fibers, results in a lightweight and very strong article.

When forming the foam core 70, as shown in FIG. 3, it is usually desirable to place a layer of fine fibrous material 104 against the inner surfaces 50, 52 of the spacers 42, 44, such as several sheets of fine fibrous material of the consistency of tissue paper. As the foam expands, it encounters the layers of fine fibrous material, which have fine pores that greatly slow the rate of expansion of the foam. The foamable material only slowly penetrates through the fine fibers, and may penetrate through perhaps only half of the sheets of fibrous material before the foam stops expanding. This has the advantage that the expanding foam material does not press directly against the inner surfaces 50, 52 of the spacers. Foam material bonds readily to most materials, and a lack of contact of the foam with the spacers facilitates removal of the spacers from the foam core. Actually, applicant prefers to remove that portion of the fine fibrous material that has not been penetrated by foam and to sand the outer surface of the foam core to provide a smooth surface. It is noted that the use of such fine fibrous material is described in applicant's earlier U.S. Pat. No. 4,664,974.

The spacers 42, 44 can be constructed at low cost because they do not have to posses high strength, but only have to take up space and withstand low forces. One way to make the spacers is to lay up fiberglass with resin to build up a layer of the desired thickness, directly against the inner surfaces of the mold members 22, 24. It is possible to use a single spacer if the foam core can be removed from it, or to use more than two spacers, although two spacers are usually preferred.

Figure 9:
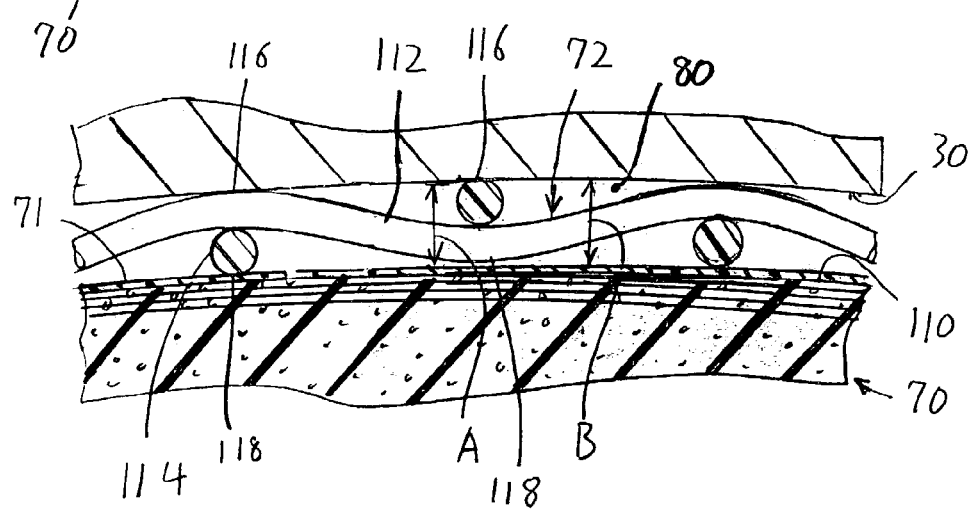
FIG. 9 is an enlarged view of a portion of FIG. 6.

FIG. 9 shows an example of a fibrous material 72 that may be used to lie in the space 80 between the mold cavity 30 and nonporous sheet 71 at the outer surface 110 of the foam core 70. The particular fibrous material 72 is a cloth wherein fibers 112, 114 have been woven. Top and bottom locations 116, 118 of the cloth fibrous material press against the walls of the cavity and foam core. The thickness A of the fibrous material when pressed flat, is preferably at least three-quarters, and more preferably about 100%, of the thickness B of the space 80 to be occupied by the injected resin, assuming that most of the walls of the article are of about the same thickness. This allows the fibrous material to space the walls 30, 110 (or 71) apart. In some cases, a few sheets of thinner fibrous material are laid on one another to space the foam from the mold cavity walls. It is possible to use small spacer members to space the foam core from the cavity walls, but they are generally not useful. The fibrous material may include more than one thinner layer of woven or matt material laid on one another.

Figure 10:
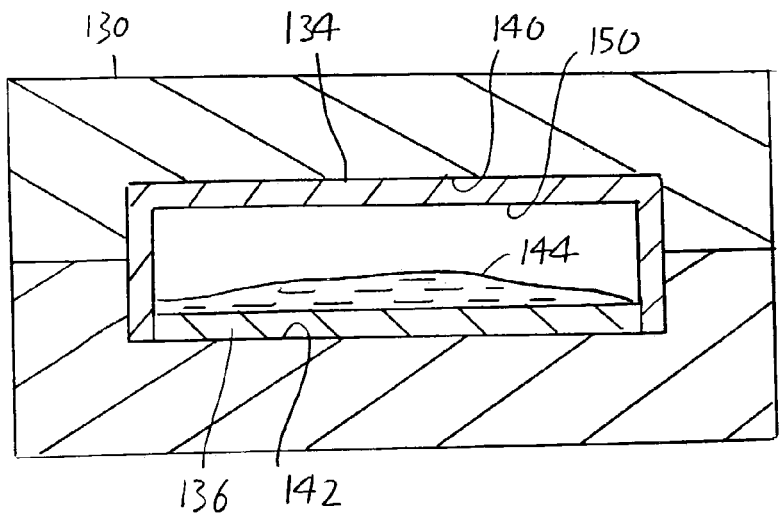
FIG. 10 is a sectional view of apparatus for forming another article, in accordance with another embodiment of the invention.
Figure 11:
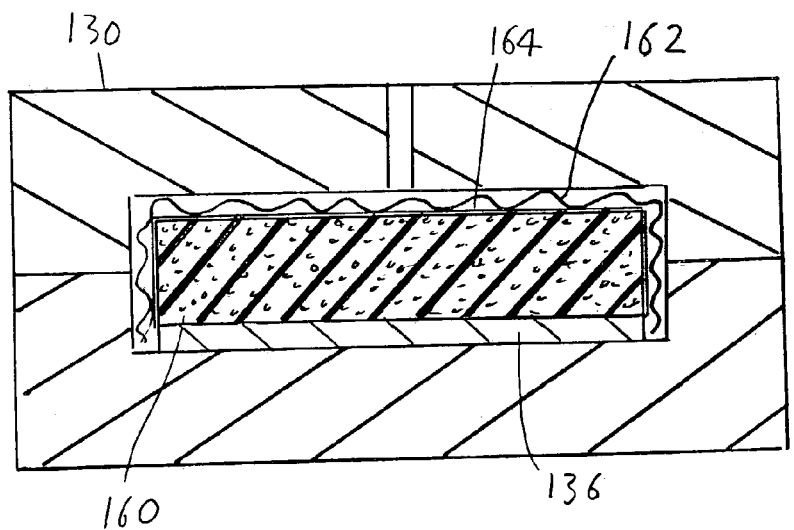
FIG. 11 is a next step in the formation of the article, using some of the apparatus of FIG. 10.
Figure 12:
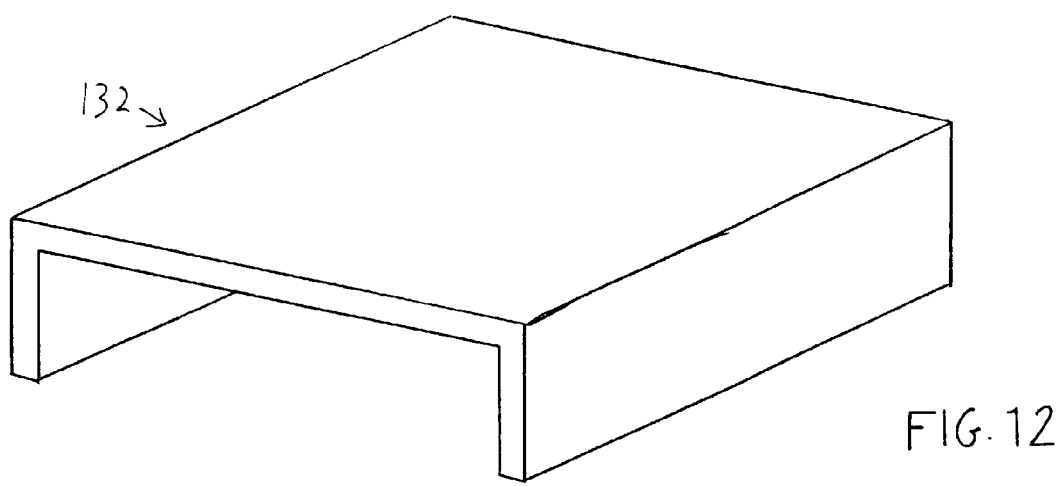
FIG. 12 is an isometric view of the article formed by the apparatus of FIGS. 10 and 11.

FIG. 10 illustrates a mold 130 for constructing an article shown at 132 in FIG. 12, which is not completely hollow. The method of FIG. 10 includes placing a pair of spacers 134, 136 in the mold 130, the spacers having outer surfaces corresponding to the shape and size of the mold surfaces 140, 142. The spacer 136 actually serves as part of the mold 130. Then, foamable material 144 is placed between the spacers and allowed to expand to form a foam core lying in the free volume 150 between the spacers. The parts are removed and the resulting foam core shown at 160 in FIG. 11 is partially wrapped in fibrous material 162 and an impervious sheet 164 and placed again in the mold cavity. In FIG. 11, the spacer 136 is left in place. After resin is injected and hardens, all of the parts are removed. The spacer 136 is removed from the final article 132 as is the foam core 160, to leave the final article shown at 132 in FIG. 12.

Figure 7:
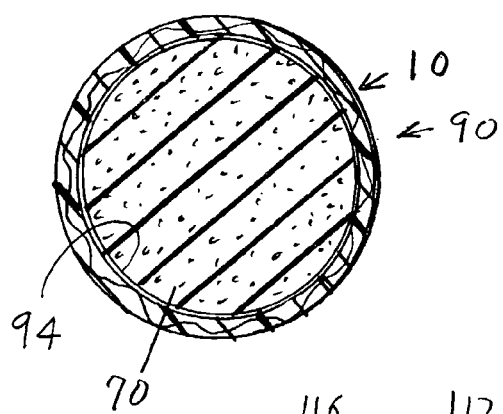
FIG. 7 is a sectional view of the article of FIG. 1, after it and the foam core have been removed from the mold of FIG. 6, and a thin plastic has been wrapped around the foam core.

While applicant has shown the same mold used to form the foam core such as 160 in FIG. 12 and 70 in FIG. 7, as well as to mold the resin around the fibrous material, it is, of course, possible to use a separate mold of the same cavity shape.

Thus, the invention provides a method for constructing a fiber-reinforced polymer article and apparatus useful in such construction. First, a foam core is molded against one or more spacers lying in a mold. One or more of the spacers have the shape of the final article. After the foam core is formed, the mold is opened and one or more spacers and the foam core are removed. The foam core is wrapped in fibrous material and placed back into the same or another mold. Then, polymer material, preferably a resin, is injected into the mold to fill the space largely occupied by the fibrous material and lying between the fiber core and the walls of the mold. When the resin has harden, the mold is opened and the foam core is separated from the article, which may involve breaking up the foam core to remove it from a hollow article.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for constructing a fiber-reinforced polymer article with the use of a mold that has a mold cavity with a first cavity surface, comprising:

placing a first spacer in the mold cavity, wherein said spacer has a mold-conforming first spacer surface that conforms to said first cavity surface, and wherein said spacer is thinner than said mold cavity to leave a free volume on a side of said spacer opposite said first cavity surface;

placing foamable material in said free volume and allowing said foamable material to expand and push said spacer toward said first cavity surface and form a foam core;

opening said mold and removing said spacer;

establishing fibrous material in a spacer-formed volume previously occupied by said spacer, and closing said mold with said foam core lying in said free volume and substantially against said fibrous material;

injecting a flowable polymer into said spacer-formed volume previously occupied by said spacer and around said fibrous material therein and allowing said resin to harden, and removing the article that comprises said fibrous material surrounded by said hardened polymer from said mold cavity.

2. The method described in claim 1 wherein said article is a hollow article, and said mold cavity has a second cavity surface opposite said first cavity surface, including:

placing at least a second spacer in the mold cavity, wherein said second spacer has a mold-conforming second spacer surface that conforms to said second cavity surface, said free volume lying between said spacers, and said spacers form a continuous spacer volume extending around said free volume; and wherein said step of placing foamable material in said free volume includes placing said material between said spacers;

said step of establishing at least one layer of fibrous material includes placing fibrous material in a spacer volume previously occupied by said spacers;

said step of injecting includes injecting resin into said spacer volume previous occupied by said spacers and allowing the resin to harden to form said article as a hollow article with an inside; and including removing said foam core from the inside of said hollow article.

3. The method described in claim 2 wherein:

said steps of opening said mold and establishing at least one layer of fibrous material, includes removing said foam core from the mold cavity, wrapping the mold core in said fibrous material, and replacing the wrapped mold core in said cavity.

4. The method described in claim 3 wherein:

said fibrous material comprises a flexible woven cloth and has a thickness more than one-half but less than the full thickness of said spacers, said cloth tending to assume a wavy state when wrapped about an object, and said step of replacing includes deflecting said flexible woven cloth between said foam core and said spacers to fit therebetween.

5. A method for constructing a fiber-reinforced polymer article, with the use of at least one mold that has a plurality of mold parts that form a mold cavity with a cavity surface, comprising:

placing a plurality of spacers against said cavity surface, to leave a free volume within said spacers, and placing a quantity of foamable material in said free volume, said quantity of foamable material being sufficient to completely fill said free volume when said foamable material foams and thereby forms a foam core within said spacers with locations on said foam core lying facewise adjacent to said spacers;

removing said spacers and said foam core from said mold;

wrapping fibrous material around said foam core, at least at location on the foam core that lie facewise adjacent to said spacers, and placing the wrapped foam core in the mold;

injecting a polymer material into a space partially occupied by said fibrous material and allowing said polymer to harden.

6. The method described in claim 5 including:

removing said foam core from an article formed by said fibrous material encased in said polymer material.

7. The method described in claim 6 wherein:

said step of removing said foam core includes disintegrating the foam core and removing it through a hole in said article.

8. A method for molding a hollow fiber reinforced polymer article, comprising:

establishing a hollow spacer means within and against cavity walls of a hollow mold cavity, said spacer means leaving a free volume therewithin;

placing a foamable material within the hollow spacer and allowing it to foam and fill the free volume to form a foam core;

removing the hollow spacer means and foam core from the mold;

establishing fibrous material around the foam core and placing the foam core, without the spacer means but with the fibrous material, in the mold, establishing a polymer in the space between the foam core and the mold cavity walls that are partially occupied by the fibrous material, and allowing the polymer to solidify to form a hollow article;

removing the foam core from the hollow article.

* * * * *